Patented June 23, 1953

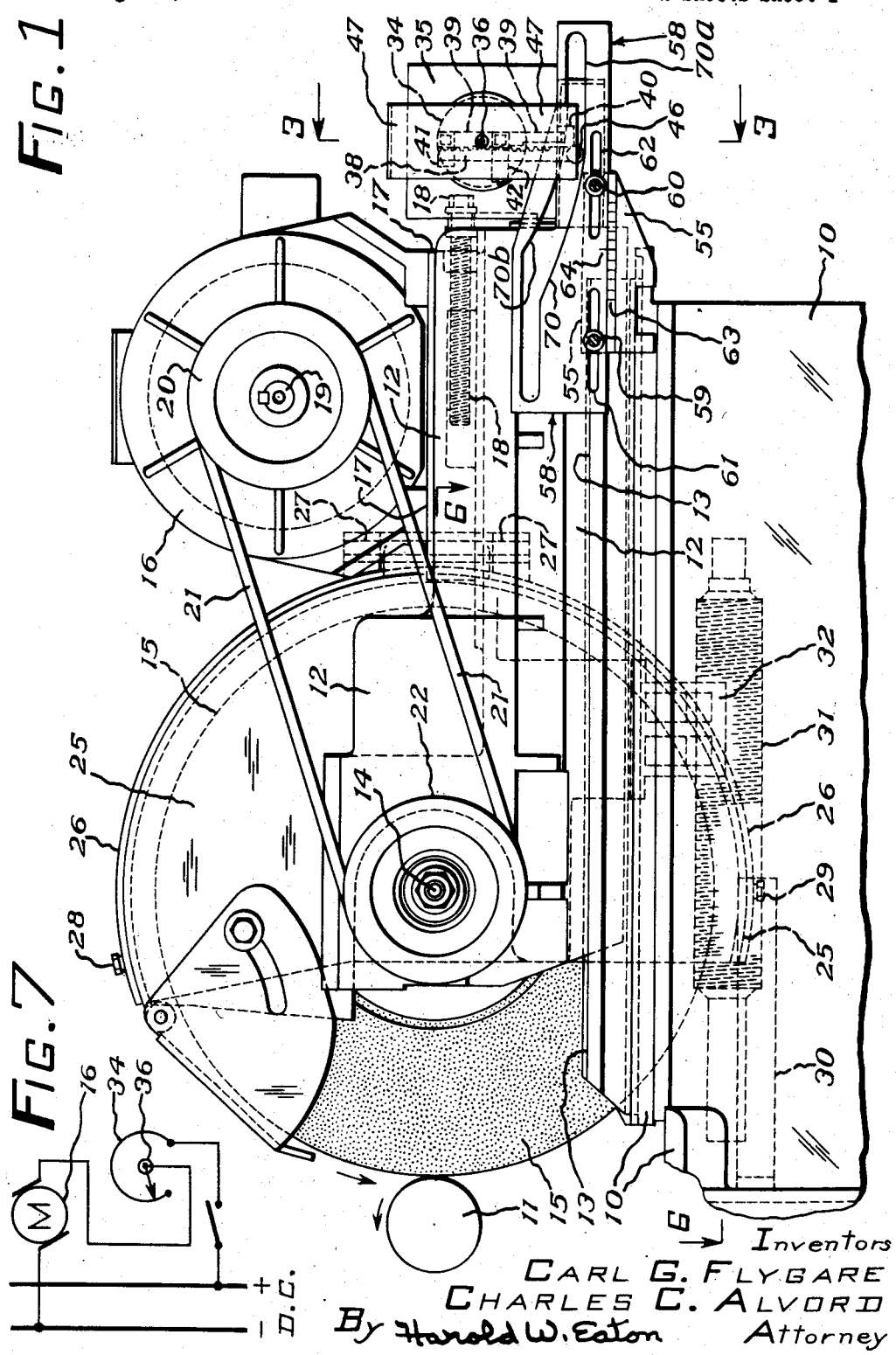

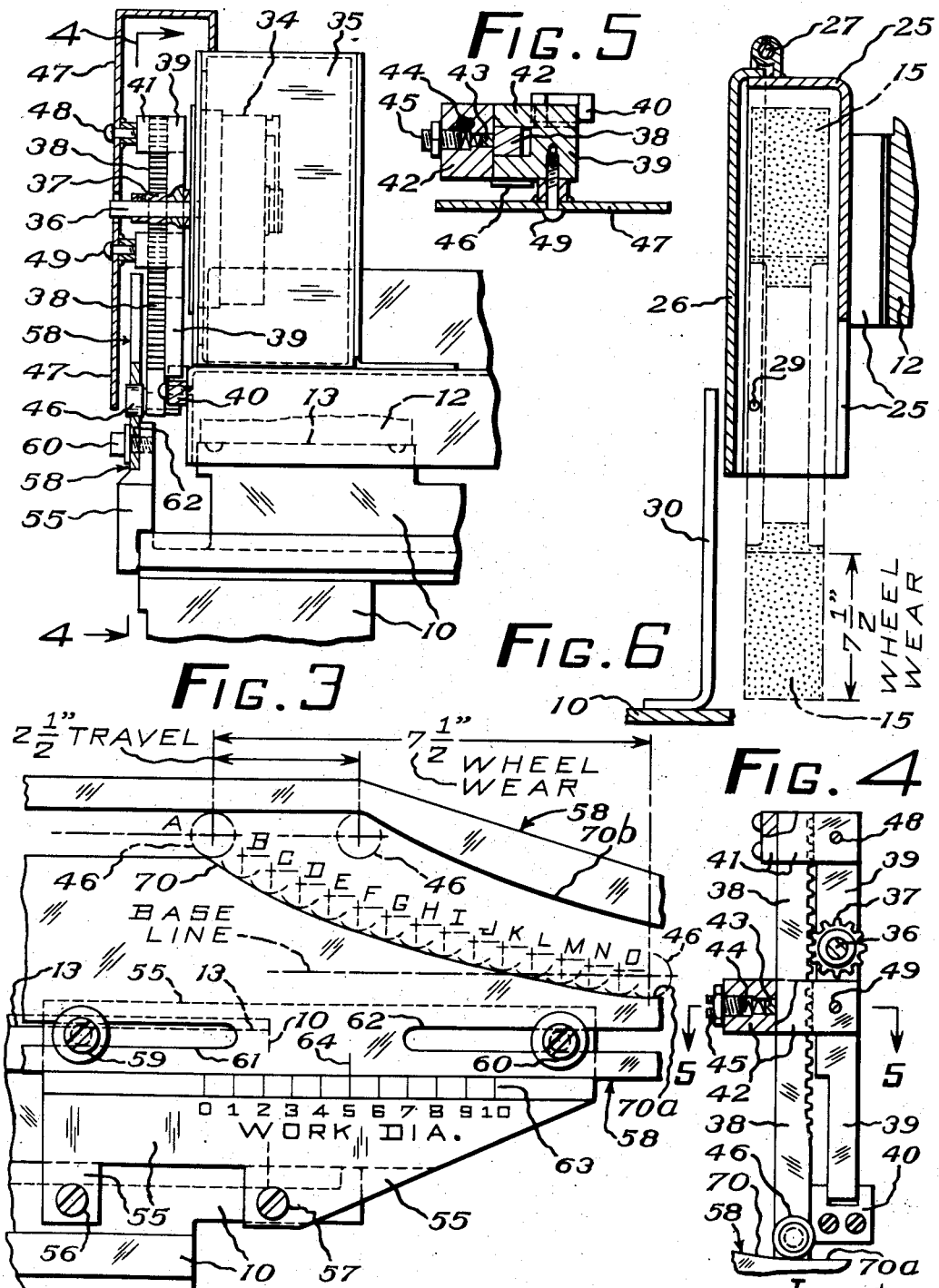

2,642,703

UNITED STATES PATENT OFFICE 2,642,703

GRINDING WHEEL-SPEED CONTROL

Carl G. Flygare and Charles C. Alvord, Worcester, Mass., assignors to Norton Company, Worcester, Mass., a corporation of Massachusetts Application August 18, 1951, Serial No. 242,443

8 Claims. (Cl. 51—134.5)

1

The invention relates to grinding machines, and more particularly to a speed control device for maintaining a uniform peripheral speed of the grinding wheel.

One object of the invention is to provide a simple and thoroughly practical speed control mechanism automatically to maintain a uniform peripheral speed of the grinding wheel. Another object is to provide a cam-controlled rheostat automatically to vary the speed of the wheel driving motor so as to maintain a constant peripheral speed of the grinding wheel as it wears away. Another object is to provide a closed cam which is shaped so as to facilitate normal movement of the grinding wheel to and from an operative position without a change of wheel speed. Another object is to provide adjustably mounted cam which may be positioned for grinding work pieces of different diameters. Another object is to provide a cam which is shaped so as to return the rheostat to its initial position automatically to slow-down the speed of the spindle driving motor when the wheel slide is moved to an extreme rearward position when a new grinding wheel is to be mounted on the spindle.

A further object is to provide a safety device to prevent opening the wheel guard for changing grinding wheels except when the wheel slide is in an extreme rearward or inoperative position. Another object of the invention is to provide a graduated scale to facilitate positioning the control cam for grinding work pieces of given diameters. Other objects will be in part obvious or in part pointed out hereinafter.

In the accompanying drawings in which is shown one of various possible embodiments of the mechanical features of this invention, Fig. 1 is a side elevation of a portion of a grinding machine embodying the invention;

Fig. 2 is a fragmentary elevation, on an enlarged scale, showing the cam and associated parts for controlling and actuating the rheostat for regulating the speed of the grinding wheel driving motor;

Fig. 3 is a fragmentary sectional view, on an enlarged scale, taken approximately on the line 3—3 of Fig. 1, through the mechanism for controlling and actuating the rheostat;

Fig. 4 is a fragmentary vertical sectional view, on an enlarged scale, taken approximately on the line 4—4 of Fig. 3;

Fig. 5 is a cross-sectional view, taken approximately on the line 5—5 of Fig. 4;

Fig. 6 is a fragmentary sectional view, on an enlarged scale, taken approximately on the line 6—6 of Fig. 1, showing the safety device for preventing opening the wheel guard except when the wheel slide is in an extreme rearward or inoperative position; and Fig. 7 is a simplified electrical diagram.

A grinding machine has been illustrated in the drawings comprising a base 10 which is provided with a rotatable work support (not shown) for supporting a cylindrical piece of work 11. This work support may be identical with that shown in the prior United States Patent No. 2,522,485 to H. A. Silven and C. G. Flygare dated September 12, 1950, to which reference may be had for details of disclosure not contained herein.

The base 10 serves as a support for a transversely movable wheel slide 12 which is arranged to slide transversely on a flat way 13 and a V-way (not shown) formed on the upper surface of the base 10. A grinding wheel spindle 14 is journalled in suitable bearings (not shown) formed within the wheel slide 12. The wheel spindle 14 serves as a support for a grinding wheel 15.

A suitable driving mechanism is provided for the spindle 14 and grinding wheel 15 comprising a variable speed electric motor 16 which is mounted on a motor base 17 adjustably positioned on top of the wheel slide 12. An adjusting screw 18 is provided for adjusting the position of the motor base 17 and the motor 16 to facilitate tensioning the driving belts to be hereinafter described. The motor 16 is provided with an armature shaft 19 which supports a multiple V-groove pulley 20. The V-groove pulley 20 is connected by multiple V-belts 21 with a multiple V-groove pulley 22 mounted on the end of the wheel spindle 14. As shown in the drawings the pulleys 20 and 22 are of an equal diameter so as to provide a one to one ratio between the armature shaft 19 and the wheel spindle 14.

A wheel guard 25 surrounds the grinding wheel 15 and is fixedly mounted on the side face of the wheel slide 12. In order to facilitate changing grinding wheels 15, the wheel guard 25 is provided with a hinged cover 26 which is arranged to swing on a hinged stud 27 (Fig. 6). A pair of screws 28 and 29 are provided for locking the cover 26 in an operative position. It is desirable to provide a safety device to prevent opening the hinged cover 26 of the wheel guard 25 except when the wheel slide 12 is in an extreme rearward or inoperative position. This mechanism may comprise a bracket 30 which is fixedly mounted relative to the base 10. The bracket 30 is arranged in close proximity to the side face of the cover 26 so as to prevent swinging the cover 26 to an open position except when the wheel slide is in a rearward or inoperative position.

A suitable grinding wheel feeding mechanism is provided for feeding the wheel slide 12 transversely in either direction. This mechanism may comprise a rotatable feed screw 31, rotatably supported by the base 10, which meshes with or engages a half nut 32 depending from the underside of the wheel slide 12. The mechanism for rotating the feed screw 31 for a grinding feed and for moving the feed screw 31 axially for moving the wheel slide 12 to and from an operative position may be identical with that disclosed in the prior United States Patent No. 2,522,485, above referred to, to which reference may be had for details of disclosure not contained herein. The axial positioning movement of the feed screw 31 may be approximately two and one half inches.

It is desirable to provide an adjustable speed control mechanism for controlling and regulating the speed of the motor 16 so as to facilitate an automatic adjustment thereof to vary the speed of the motor automatically as the wheel wears away so as to maintain a substantially constant peripheral speed of the wheel during its entire active use. This mechanism may comprise a rheostat 34 having a rotatable rheostat shaft 36. The rheostat 34 is contained within a box-like housing 35 which is fixedly mounted on the rear of the wheel slide 12. The rheostat shaft 36 is provided with a gear 37 which meshes with a vertically arranged slidably-mounted rack bar 38. A bracket 39 is supported by the rheostat shaft 36 and is held in a vertical position by means of a U-shaped clip 40 which is fixedly mounted relative to the wheel slide 12. The bracket 39 is provided with a pair of spaced bearings 41 and 42 within which the rack bar 38 may slide. A friction plunger 43 is carried by the bracket 39. The plunger 43 is backed up by a compression spring 44. An adjusting screw 45 is provided to facilitate adjustment of the compression of the spring 44. The lower end of the rack bar 38 is provided with a rotatable follower roller 46. The mechanism just described is enclosed by a cover or housing 47 which is fastened by a pair of spaced screws 48 and 49 to the vertically arranged bracket 39.

A suitable mechanism is provided automatically to move the follower roller 46 so as to actuate the rheostat 34 to maintain a uniform peripheral speed of the grinding wheel as it wears away due to grinding or truing. As illustrated in the drawings a bracket 55 (Figs. 2 and 3) is fastened to the base 10 of the machine by a pair of spaced screws 56 and 57. The bracket 55 serves as a support for an adjustably mounted cam plate 58. A pair of spaced clamping screws 59 and 60 pass through elongated slots 61 and 62 respectively and are screw threaded into the bracket 55. It will be readily apparent from the foregoing disclosure that by loosening the screws 59 and 60, the cam plate 58 may be adjusted longitudinally relative to the bracket 55 as desired. The bracket 55 is provided with a scale 63 graduated in inches-work diameter. The cam plate 58 is provided with an index mark 64 which as illustrated in Fig. 2 is set in position for grinding work pieces of five inches diameter. If work pieces of other diameters from zero to ten inches are to be ground, it is necessary to adjust the cam plate 58 longitudinally to position the index mark 64 opposite the desired graduation on the scale 63 corresponding to the diameter of the work piece to be ground.

As shown in the drawings the cam plate 58 is designed for controlling the speed of a thirty inch diameter grinding wheel and to maintain a substantially uniform peripheral speed of 6500 surface feet per minute until the grinding wheel has been worn away due to grinding and truing to a 15 inch diameter. The cam plate 58 is provided with a cam portion 70 which is arranged to control the movement of the follower roller 46 so as to automatically actuate the rheostat 34 and increase the speed of the wheel as the diameter thereof is reduced in size. The shape of the cam 70 is such that the wheel slide may be moved to and from an operative position through a distance of two and one-half inches maximum travel without affecting the position of the rheostat 34. With a 30 inch diameter wheel positioned on the wheel spindle 14, the axis of the follower roller 46 is on the base line as indicated in Fig. 2. The wheel 15 is shown in a forward grinding position. After the grinding has been completed, the wheel slide 12 may be retracted and the follower roller 46 rides idly through a horizontal portion 70a of the cam 70 so that no motion is imparted to the rheostat shaft 36. As the grinding wheel wears away due to truing or grinding, the wheel slide 12 must be advanced through a greater distance toward the left (Fig. 1) to grind the work piece to the required and predetermined size. As the wheel slide 12 moves further toward the left, the follower roller 46 rides up the curved face of the cam 70. During this movement the upward movement of the follower roller 46 imparts a rotary motion to the rheostat shaft 36 through the rack bar 38 and the gear 37 to adjust the rheostat so as to increase the speed of the motor sufficiently to maintain a uniform peripheral speed of 6500 S. F. P. M. As the forward advance of the slide 12 continues due to reduced diameter of the grinding wheel, the axis of the follower roller 46 successively reaches positions O, N, M, L, K, J, I, H, G, F, E, D, C, B and A at which point the grinding wheel has been reduced in diameter to 15 inches. A chart is illustrated below showing for each of the positions A, B, C, D, E, F, G, H, I, J, K, L, M, N, O the height of the axis of the roller 46 above the base line for each one inch variation in the wheel diameter together with the R. P. M. of the armature shaft 19 of the motor 16 to maintain a constant surface speed of 6500 S. F. P. M.

| Line | Height Above Base Line | Wheel Dia. | R. P. M. |
| --- | --- | --- | --- |
| A | 2¼ | 15 | 1,655 |
| B | 1⁵¹⁄₆₄ | 16 | 1,552 |
| C | 1²³⁄₃₂ | 17 | 1,462 |
| D | 1½ | 18 | 1,380 |
| E | 1⁵⁄₁₆ | 19 | 1,308 |
| F | 1⅛ | 20 | 1,242 |
| G | ³¹⁄₃₂ | 21 | 1,182 |
| H | 1³⁄₁₆ | 22 | 1,130 |
| I | 1¹⁄₁₆ | 23 | 1,080 |
| J | ⁹⁄₁₆ | 24 | 1,035 |
| K | ²⁹⁄₆₄ | 25 | 993 |
| L | 1⁵⁄₃₂ | 26 | 955 |
| M | ¼ | 27 | 920 |
| N | 1¹¹⁄₆₄ | 28 | 888 |
| O | ⁵⁄₆₄ | 29 | 856 |
| Base | 0 | 30 | 827 |

Chart based on constant 6,500 S. F. P. M.

In each one of the positions A, B, C, D, E, F, G, H, I, J, K, L, M, N and O the follower roller 46 may move through a maximum distance of two and one-half inches during the movement of the wheel slide 12 to an inoperative position before the follower roller 46 engages the opposite face 70b of the cam 70. If the wheel slide 12 for any reason is moved through a greater distance than two and one-half inches, the follower roller 46 engaging the cam face 70b will cause a rotary motion to be imparted to the rheostat shaft 36 to decrease the speed of the motor 16.

The operation of this improved speed control device will be readily apparent from the foregoing disclosure. In setting up a machine for a grinding operation the cam plate 58 is adjusted in the manner above described so that the index mark 64 on the cam plate is opposite the diameter of the work to be ground on the scale 63. When the cam plate 58 has been adjusted, the clamping screws 59 and 60 are then tightened to lock the cam plate 58 rigidly to the bracket 55. The grinding operation may then be started with a full size 30 inch diameter wheel. After each work piece has been ground, the wheel slide 12 may be backed off through the required distance, not to exceed two and one-half inches. As the grinding operation proceeds and the wheel wears away, the increased forward movement of the wheel slide 12 causes an upward movement of the follower roller 46 which imparts a rotary motion to the rheostat shaft 36 to advance the speed of the motor 16 sufficiently to maintain a substantially constant peripheral speed of 6500 S. F. P. M. This increase of speed continues from an initial motor speed of 827 R. P. M. with a 30 inch diameter wheel until the speed has reached 1655 R. P. M. when the grinding wheel has been worn away due to wheel wear and truing to a 15 inch diameter wheel. When the wheel reaches a 15 inch diameter, it is necessary to replace the same with a full size wheel. This is accomplished by moving the wheel slide 12 to an extreme rearward position so that the hinged cover 26 of the wheel guard 25 may be swung in a clockwise direction (Fig. 6) and the cover will clear the end of the safety bracket 30. During this rearward movement of the wheel slide 12 to an inoperative position, the roller 46 rides down the face 70b of the cam 70 which serves to cause a downward movement of the roller 46 thereby causing a counterclockwise rotation of the rheostat shaft 36 to reduce the rotary speed of the motor 16 from 1655 R. P. M. to 827 R. P. M. The new wheel may then be mounted in position on the spindle after which the cover 26 may be again swung into an operative position and fastened therein by means of the screws 28 and 29 after which the grinding operation may again be resumed.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine having a base, a transversely movable slide thereon, feeding means operatively connected between the base and slide to feed said slide transversely relative to the base in either direction, a rotatable grinding wheel spindle on said slide, a grinding wheel thereon, an electric motor on said slide for rotating said spindle, a speed control device including an adjustable rheostat on said slide operatively connected to vary the speed of said motor, and means including a cam on said base and a follower on said slide operatively connected to actuate said rheostat in timed relation with the transverse movement of the slide to maintain a constant peripheral speed of the grinding wheel as it wears away.

2. In a grinding machine having a base, a transversely movable slide thereon, feeding means operatively connected to feed said slide transversely in either direction relative to the base, a rotatable grinding wheel spindle on said slide, a grinding wheel thereon, means including an electric motor on said slide to rotate said spindle, a speed control device including an adjustable rheostat on said slide to vary the speed of said motor, means including a cam on said base, and a follower on said slide operatively connected to actuate said rheostat in timed relationship with the transverse movement of the slide to maintain a constant peripheral speed of the grinding wheel as it wears away.

3. In a grinding machine having a base, a transversely movable wheel slide thereon, feeding means operatively connected to feed said slide transversely in either direction relative to the base, a rotatable grinding wheel spindle on said slide, a grinding wheel thereon, an electric motor on said slide for rotating said spindle, a speed control device including an adjustable rheostat on said slide to vary the speed of said motor, means including a cam on said base and a follower on said slide interposed between the wheel slide and base, operative connections between the follower and rheostat to actuate said rheostat in timed relationship with the transverse movement of the slide to maintain a constant peripheral speed of the grinding wheel as it wears away, and adjustable connections between the base and cam to facilitate adjusting the position of said cam for any given diameter work piece.

4. In a grinding machine having a base, a transversely movable slide thereon, feeding means operatively connected to feed said slide transversely in either direction relative to the base, a rotatable grinding wheel on said slide, a grinding wheel thereon, an electric motor on said slide for rotating said spindle, a speed control device including a rheostat on said slide operatively connected to vary the speed of said motor, means including a cam on said base and a follower on said slide operatively connected to actuate said rheostat in timed relation with the transverse movement of the slide so as to maintain a constant peripheral speed of the grinding wheel, said cam being shaped so as to facilitate a normal transverse movement of the slide to and from an operative position without changing the speed of said motor.

5. In a grinding machine as claimed in claim 1, in combination with the parts and features therein specified of a vertically slidable member on said slide, a rack bar formed integrally therewith, said rheostat having a rotatable actuating shaft, a gear on said shaft meshing with said rack for actuating said rheostat, a rotatable follower roller on said member, and an adjustably mounted cam on said base engageable with the follower roller to vary the speed of said motor so as to maintain a constant peripheral speed of the grinding wheel.

6. In a grinding machine as claimed in claim 1, in combination with the parts and features therein specified of a cam adjustably mounted on said base, a follower on said slide engageable with said cam and actuated thereby for actuating said rheostat automatically to vary the speed of said motor so as to maintain a constant peripheral speed of the grinding wheel, an index mark on said cam, and a graduated scale on said base calibrated in inches-work diameter to facilitate adjusting the position of said cam relative to said base for any given diameter of work piece.

7. In a grinding machine as claimed in claim 1, in combination with the parts and features therein specified of a wheel guard partially surrounding said grinding wheel, a removable cover on said guard to facilitate replacement of the grinding wheel, and means including a lug on said base normally engageable with said cover to prevent opening said cover except when the wheel slide is in a rearward inoperative position with the rheostat positioned for rotating the grinding wheel spindle at a minimum speed.

8. In a grinding machine as claimed in claim 1, in combination with the parts and features therein specified of a wheel guard partially surrounding said grinding wheel, a hinged cover therefor to facilitate replacement of said grinding wheel, said cam being shaped to facilitate movement of the wheel slide to a rearward inoperative position and to position said rheostat so as to rotate the wheel spindle at a minimum speed, and means including a lug on said base normally in the path of movement of said cover to prevent opening said cover when the grinding wheel slide is in a rearward inoperative position.

CARL G. FLYGARE.
CHARLES C. ALVORD.

References Cited in the file of this patent

UNITED STATES PATENTS

| Number | Name | Date |
|---|---|---|
| 2,056,871 | Silven | Oct. 6, 1936 |
| 2,080,145 | Maurer | May 11, 1937 |
| 2,162,038 | Trible | June 13, 1939 |
| 2,294,153 | Alvord | Aug. 25, 1942 |